US010868692B2

(12) United States Patent
Yang et al.

(10) Patent No.: US 10,868,692 B2
(45) Date of Patent: Dec. 15, 2020

(54) MONITORING DEVICE USING AUTOMATION NETWORK

(71) Applicant: KT CORPORATION, Gyeonggi-do (KR)

(72) Inventors: Jeong-Yeop Yang, Seoul (KR); Kyung-Eun Kong, Seoul (KR); Myung-Eun Kwon, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 553 days.

(21) Appl. No.: 14/514,499

(22) Filed: Oct. 15, 2014

(65) Prior Publication Data

US 2015/0106061 A1 Apr. 16, 2015

(30) Foreign Application Priority Data

Oct. 15, 2013 (KR) .................. 10-2013-0122923

(51) Int. Cl.
*H04L 12/28* (2006.01)
*G08C 17/00* (2006.01)

(52) U.S. Cl.
CPC .......... *H04L 12/2827* (2013.01); *G08C 17/00* (2013.01); *G08C 2201/41* (2013.01)

(58) Field of Classification Search
CPC . G08C 17/00; G08C 2201/41; H04L 12/2827; H04L 12/2803; H04L 12/2832
USPC ......................................................... 702/188
See application file for complete search history.

(56) References Cited

U.S. PATENT DOCUMENTS

| | | | | |
|---|---|---|---|---|
| 2,883,255 A | * | 4/1959 | Anderson ................ | B41J 11/36 340/518 |
| 3,882,305 A | * | 5/1975 | Johnstone .......... | G05B 19/4063 702/183 |
| RE31,247 E | * | 5/1983 | Johnstone .......... | G05B 19/4063 700/169 |
| 6,507,790 B1 | * | 1/2003 | Radomski .............. | G01H 1/003 702/39 |
| 6,906,617 B1 | * | 6/2005 | Van der Meulen ......................... | H04L 12/2803 340/538 |
| 7,155,553 B2 | | 12/2006 | Lueck et al. | |
| 7,412,051 B1 | | 8/2008 | Beathard et al. | |
| 7,660,406 B2 | | 2/2010 | Fama et al. | |

(Continued)

FOREIGN PATENT DOCUMENTS

JP 11-184660 A 7/1999
JP 2005-340881 A 12/2005
(Continued)

*Primary Examiner* — Stephanie E Bloss
(74) *Attorney, Agent, or Firm* — IP Legal Services, LLC (57) ABSTRACT

The disclosure is related to monitoring a legacy device using at least one smart device. A gateway of an automation system may monitor an operation status of a target legacy device located in a service area of an automation system using at least one of smart devices participating in the automation system. In order to monitor, a monitoring request may be received for monitoring the target legacy device from user equipment associated with a user. At least one of monitoring smart devices may be controlled for monitoring the target legacy device. Monitoring results may be received from the at least one of monitoring smart devices. The received monitoring results may be provided to the user through the user equipment using at least one of outputting monitoring smart devices.

17 Claims, 5 Drawing Sheets

(56) References Cited

U.S. PATENT DOCUMENTS

| | | | |
|---|---|---|---|
| 7,971,139 B2 | 6/2011 | Stanciu et al. | |
| 8,032,780 B2 | 10/2011 | Koh et al. | |
| 8,112,506 B2 | 2/2012 | Son et al. | |
| 8,180,379 B2 | 5/2012 | Forstall et al. | |
| 8,447,541 B2* | 5/2013 | Rada | G05F 1/70 62/130 |
| 8,797,464 B2 | 8/2014 | Kim et al. | |
| 8,813,195 B2 | 8/2014 | Wen et al. | |
| 8,984,944 B2* | 3/2015 | Bernard | G01N 29/14 73/587 |
| 9,020,769 B2* | 4/2015 | Rada | G01D 4/00 702/60 |
| 9,310,405 B2* | 4/2016 | Lai | G01R 21/133 |
| 9,326,126 B2 | 4/2016 | Yang | |
| 2003/0065824 A1 | 4/2003 | Kudo | |
| 2004/0170262 A1 | 9/2004 | Ohno | |
| 2005/0152380 A1 | 9/2005 | Lee et al. | |
| 2007/0130280 A1 | 6/2007 | Park et al. | |
| 2007/0214262 A1 | 9/2007 | Buchbinder et al. | |
| 2008/0019392 A1 | 1/2008 | Lee | |
| 2008/0271123 A1 | 10/2008 | Ollis et al. | |
| 2009/0248244 A1 | 10/2009 | Sumimoto et al. | |
| 2010/0042720 A1 | 2/2010 | Stienhans et al. | |
| 2010/0191487 A1* | 7/2010 | Rada | G05F 1/70 702/60 |
| 2010/0210317 A1 | 8/2010 | Kakehi | |
| 2011/0106279 A1 | 5/2011 | Cho et al. | |
| 2011/0125432 A1* | 5/2011 | Pomerantz | G05B 19/058 702/62 |
| 2011/0251807 A1* | 10/2011 | Rada | G01D 4/00 702/61 |
| 2011/0287748 A1 | 11/2011 | Angel et al. | |
| 2012/0065797 A1 | 3/2012 | Brian et al. | |
| 2012/0179547 A1 | 7/2012 | Besore et al. | |
| 2012/0209916 A1 | 8/2012 | Azuma et al. | |
| 2012/0221673 A1 | 8/2012 | Lee et al. | |
| 2013/0060358 A1 | 3/2013 | Li et al. | |
| 2013/0091950 A1* | 4/2013 | Bernard | G01N 29/14 73/587 |
| 2013/0147954 A1 | 6/2013 | Song et al. | |
| 2013/0179593 A1 | 7/2013 | Dunlap et al. | |
| 2013/0204408 A1* | 8/2013 | Thiruvengada | H04L 12/2827 700/90 |
| 2013/0239205 A1 | 9/2013 | Jacobs et al. | |
| 2013/0289752 A1* | 10/2013 | Orsat | H04L 63/065 700/90 |
| 2014/0052783 A1 | 2/2014 | Swatsky et al. | |
| 2014/0172328 A1* | 6/2014 | Lai | G01R 21/133 702/60 |
| 2014/0215043 A1 | 7/2014 | Ryu et al. | |
| 2014/0267907 A1 | 9/2014 | Downes et al. | |
| 2014/0304385 A1 | 10/2014 | Lee et al. | |
| 2014/0359675 A1 | 12/2014 | Mank | |
| 2015/0032805 A1 | 1/2015 | Huang et al. | |
| 2015/0055640 A1 | 2/2015 | Wang et al. | |
| 2017/0202039 A1 | 7/2017 | Logue et al. | |

FOREIGN PATENT DOCUMENTS

| | | |
|---|---|---|
| JP | 2009-101763 A | 5/2009 |
| JP | 2009-234466 A | 10/2009 |
| KR | 10-1997-0057199 A | 7/1997 |
| KR | 10-2005-0049773 A | 5/2005 |
| KR | 10-2005-0062896 A | 6/2005 |
| KR | 10-0497914 B1 | 6/2005 |
| KR | 10-2005-0073015 A | 7/2005 |
| KR | 10-2006-0008679 A | 1/2006 |
| KR | 10-2007-0058977 A | 6/2007 |
| KR | 10-0772412 B1 | 11/2007 |
| KR | 10-2008-0051040 A | 6/2008 |
| KR | 10-2008-0096239 A | 10/2008 |
| KR | 10-2009-0030393 A | 3/2009 |
| KR | 10-2009-0118424 A | 11/2009 |
| KR | 10-2010-0084782 A | 7/2010 |
| KR | 10-2011-0009338 A | 1/2011 |
| KR | 10-2011-0047764 A | 5/2011 |
| KR | 10-2011-0059479 A | 6/2011 |
| KR | 10-2011-0066000 A | 6/2011 |
| KR | 10-2011-0066001 A | 6/2011 |
| KR | 10-1052074 B1 | 7/2011 |
| KR | 10-2012-0025229 A | 3/2012 |
| KR | 10-2012-0058169 A | 6/2012 |
| KR | 10-2012-0098215 A | 9/2012 |
| KR | 10-2012-0139777 A | 12/2012 |
| KR | 10-2013-0066829 A | 6/2013 |

* cited by examiner

MONITORING DEVICE USING AUTOMATION NETWORK

CROSS REFERENCE TO PRIOR APPLICATIONS

The present application claims priority under 35 U.S.C. § 119 to Korean Patent Application No. 10-2013-0122923 (filed on Oct. 15, 2013), which is hereby incorporated by reference in its entirety.

The subject matter of this application is related to U.S. patent application Ser. No. 14/191,756 filed Feb. 27, 2014, now U.S. Pat. No. 9,120,437, U.S. patent application Ser. No. 14/172,118 filed Feb. 4, 2014, now U.S. Pat. No. 9,215,551, and U.S. patent application Ser. No. 14/484,594 filed Sep. 12, 2014, now U.S. Pat. No. 9,326,126, the teachings of which are incorporated herein their entirety by reference.

BACKGROUND

The present disclosure relates to an automation network and, more particularly, to monitoring a legacy device using a smart device in an automation network.

Lately, a smart home automation system has been introduced. Such a home automation system may group a plurality of smart devices (e.g., smart home appliances) through a communication network and perform a predetermined task with minimum interaction of a user by controlling the plurality of smart devices. Such a smart home automation system improves convenience of a daily life significantly. However, the smart home automation system cannot control or monitor a legacy device, incapable of communicating and not supporting such a smart home automation system, although the legacy device is located within a service area of the smart home automation system.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, a legacy device may be monitored through at least one of smart devices participating in a home network system.

In accordance with another aspect of the present embodiment, a device incapable of communication and not supporting a smart home system may be monitored through at least one of a device supporting a smart home system.

In accordance with still another aspect of the present invention, constituent elements (e.g., a camera module, a speaker module, and a sensor module mounted on a smart device) of each smart device participated in an automation network may be independently controlled to monitor a legacy device in a service area of the automation network.

In accordance with at least one embodiment, a method may be provided for monitoring an operation status of a target legacy device located in a service area of an automation system using at least one of smart devices participating in the automation system. The method may include receiving monitoring results for monitoring the target legacy device from at least one of monitoring smart devices selected from the smart devices participating in the automation system, determining an output pattern of the target legacy device based on the received monitoring results, and detecting an operation status of the target legacy device based on the determined output pattern. The monitoring results may include at least one of desired types of data collected from the target legacy device by the monitoring smart devices. Each one of the monitoring results may be collected using at least one constituent element of a corresponding monitoring smart device. The monitoring results may include at least one of a sound level measured from the target legacy device, a vibration intensity measured from the target legacy device, a temperature measured from the target legacy device, an image capturing at least one part of the target legacy device, a video data capturing at least one part of the target legacy device, and audio data outputted from the target legacy device.

The receiving may include selecting at least one of smart devices participating in the automation system as the monitoring smart devices for monitoring the target legacy device and controlling each one of the selected monitoring smart devices to collect a corresponding desired type of data output from the target legacy device.

The selecting may include selecting at least one of, as the monitoring smart devices, a smart device located within a predetermined distance from the target legacy device, a smart device capable of collecting a corresponding desired type of data output from the target legacy device, and a smart device capable of communicating to other entities in the automation system.

The controlling may include generating a control signal to include information on the target legacy device, a desired type of data to collect from the target legacy device, a time interval to collect, and a destination to transmit the collected desired type of data and transmitting the generated control signal to the selected monitoring smart devices.

Prior to the receiving, the method may further include receiving a monitoring request from user equipment associated with a user, wherein the monitoring request includes information on the target legacy device and desired types of data to collected from the target legacy device.

The determining an output pattern of the target legacy device may include combining the received monitoring results, as the output pattern of the target legacy device, wherein each one of the received monitoring results is one of the desired type of data different from the other and collected using at least one constituent element of a corresponding one of the monitoring smart devices.

The detecting an operation status of the target legacy device may include comparing the determined output pattern with output patterns recorded in a status table of the target legacy device, detecting an output pattern in the status table, which is matched with the determined output pattern based on the comparison result, obtaining an operation status mapped to the detected output pattern, and identifying the obtained operation status as a current operation status of the target legacy device.

The method may further include providing the detected operation status of the target legacy device to an associated user through user equipment of the associated user. The providing may include selecting at least one smart device as an outputting smart device from the smart devices participating in the automation system, transmitting information on the detected operation status to the selected outputting smart device, and controlling the selected outputting smart device to output the transmitted information through at least one constituent element of the selected outputting smart device. The selecting includes selecting at least one of, as the outputting smart devices, a smart device located within a predetermined distance from an associated user, a smart device capable of outputting a corresponding desired type of data output from the target legacy device, and a smart device capable of communicating to other entities in the automation system.

The providing may include comparing the detected operation status with a previous operation status and providing the detected operation status of the target legacy device to an associated user through user equipment of the associated user when the detected operation status is different from the previous operation status.

The method may further include receiving a learning request from user equipment associated with a user where the learning request includes information on the target legacy device, desired types of data to collected from the target legacy device, and a learning procedure termination condition and creating a status table of the target legacy device where the status table includes data fields and information at least one for output patterns, operation statuses, identification of the target legacy device, associated monitoring smart devices, and associated outputting smart devices.

The determining an output pattern of the target legacy device may include creating an operation status of the target legacy device and storing the created operation status in the status table of the target legacy device in connection with the determined output pattern.

After the determining an output pattern, the method may include determining whether the determined output pattern is greater than a predetermined threshold and creating an operation status of the target legacy device when the determined output patter is greater than the predetermined threshold.

In accordance with at least one embodiment, a method may be provided for monitoring an operation status of a target legacy device located in a service area of an automation system using at least one of smart devices participating in the automation system. The method may include receiving a monitoring request for monitoring the target legacy device from user equipment associated with a user, where the monitoring request includes information on the target legacy device and desired types of data to collected from the target legacy device, controlling at least one of monitoring smart devices for monitoring the target legacy device, receiving monitoring results from the at least one of monitoring smart devices, and providing the received monitoring results to the user through the user equipment using at least one of outputting monitoring smart devices.

BRIEF DESCRIPTION OF THE DRAWINGS

The above and/or other aspects of the present invention will become apparent and more readily appreciated from the following description of embodiments, taken in conjunction with the accompanying drawings, of which.

DESCRIPTION OF EMBODIMENTS

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment, legacy devices may be monitored using at least one of smart devices participating in a smart automation system. The smart automation system may denote a group of electronic devices located in a certain area (e.g., home, building, or office), coupled through a communication network, and automatically and remotely controlled by a designated control device (e.g., gateway) with minimum interaction of a user. For example, the smart automation system may include a smart building network, a smart home network, a smart home system, a residence automation system, and so forth. A device participating in the smart automation system may be referred to as a smart device. The legacy device denotes a device not participating in the smart automation system. That is, the legacy device denotes a device incapable of communicating with other entities in a communication network. For example, the legacy device may include a typical refrigerator, a gas stove, a washing machine, a dryer, and so forth.

Figure 1:
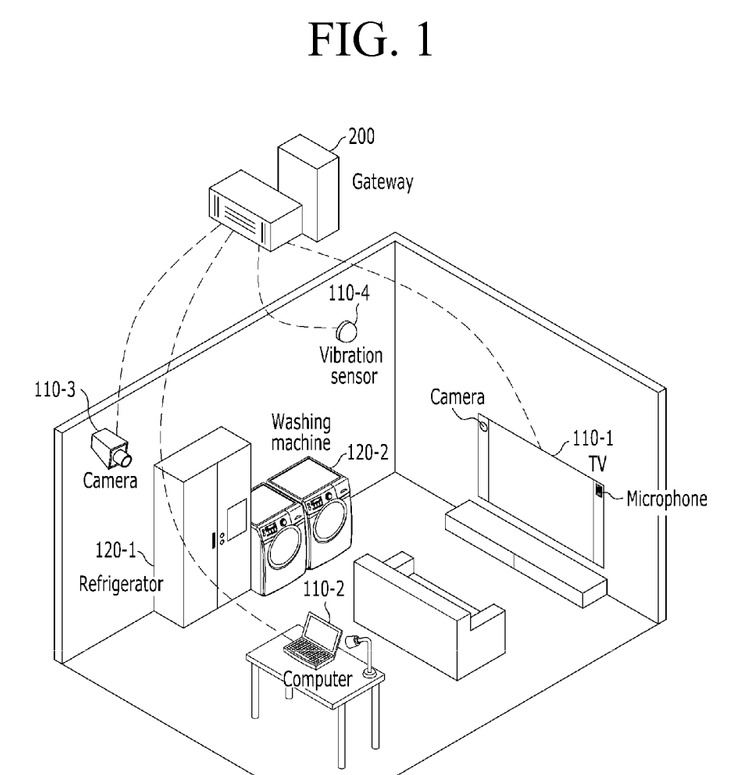
FIG. 1 illustrates a home automation system for monitoring a legacy device using at least one of smart devices in a home automation system in accordance with at least one embodiment.

Hereinafter, a system for monitoring a legacy device using at least one smart device in a predetermined automation system in accordance with at least one embodiment will be described with reference to FIG. 1. In FIG. 1, a home automation system will be described as monitoring a legacy device using smart devices, but the present invention is not limited thereto.

FIG. 1 illustrates a home automation system for monitoring a legacy device using at least one of smart devices in a home automation system in accordance with at least one embodiment.

Referring to FIG. 1, a home automation system may include gateway 200, a plurality of legacy devices (e.g., refrigerator 120-1 and washing machine 120-2) and a plurality of smart devices (e.g., smart TV 110-1, computer 110-2, security camera 110-3, and vibration sensor 110-4). Gateway 200 and smart devices 110-1 to 110-4 may be coupled through a communication link, such as a wireless communication network, a wired communication network, a short distance communication link, and so forth. Gateway 200 and smart devices 110-1 to 110-4 may communicate with each other to perform a designated operation for providing a requested service to a user.

Legacy devices 120-1 and 120-2 denote a device not participating in the home automation system. That is, such a legacy device denotes a device incapable of communicating with other entities (e.g., gateway 200 and smart devices 110-1 to 110-4) in a communication network. For example, the legacy device may include a typical refrigerator, a gas stove, a washing machine, a dryer, a dish washer, a TV set, and so forth.

Smart devices 110-1 to 110-4 may be a device participating in the smart home system. Smart devices 110-1 to 110-4 may include smart home appliances, sensors, lights, and so forth. In particular, such a smart device may receive control commands (e.g., instructions, messages, signals, or data) from gateway 200 and perform designated operations in response to the received control commands. For example, the smart device may include at least one of a sound measurement sensor, a voice recognition sensor, a vibration sensor, a luminance sensor, a thermometer, and an image recognition sensor, and so forth. Smart devices 110-1 to 110-4 may be a sensor capable of communicating with other entities in a communication network.

Smart devices 110-1 to 110-4 may include at least one of output circuits (e.g., modules) such as an image output circuit (e.g., a display such as a liquid crystal display (LCD), light emitting diode (LED), plasma display panel (PDP), and so forth) and an audio output circuit (e.g., a speaker). Furthermore, each one of smart devices 110-1 to 110-4 may be equipped with various types of functional elements, such as a camera, a microphone, a speaker, and sensors. Such constituent elements of the smart device may be control separated and independently in order to perform a designated operation, such as monitoring a legacy device in a service area of the home automation system in accordance with at least one embodiment.

Gateway 200 may communicate with various types of smart devices 110-1 to 110-4 through a communication link established between gateway 200 and smart devices 110-1 to 110-4. Gateway 200 may control and monitor smart devices 110 to perform a designated operation. Furthermore, gateway 200 may relay communication between an external communication network and smart devices 110-1 to 110-4. In addition, gateway 200 may perform a firewall function and a user authentication function. Gateway 200 may receive a command from user equipment of a user and control corresponding smart devices 110-1 to 110-4 based on the received command.

In accordance with at least one embodiment, gateway 200 may monitor output patterns of legacy devices 120-1 and 120-2 using at least one of smart devices 110-1 to 110-4 and determine current operation statuses of legacy devices 120-1 and 120-2 based on the monitored output patterns. Furthermore, when gateway 200 detects changes in operation statuses of legacy devices 120-1 and 120-2, gateway 200 informs a predetermined user through at least one smart devices 110-1 to 110-4, for example, outputting the monitored operation status of legacy devices 120-1 and 120-2 through at least one of constituent elements (e.g., a display and a speaker) of a selected smart device.

Gateway 200 was described as a controlling device for the home automation system and a device for monitoring a legacy device using at least one smart device, but the present invention is not limited thereto. For example, such a device for monitoring a legacy device using at least one smart device may be implemented as an independent device from gateway 200 or the controlling device of the home automation system and coupled to gateway 200 or the controlling device through a communication network. For convenience and ease of understanding, gateway 200 will be descried as the monitoring device for monitoring a legacy device using at least one smart device.

As describe, gateway 200 may control smart devices 110-1 to 110-4 to monitor a target legacy device and to output the monitoring result to a designated smart device in accordance with at least one embodiment. Such a gateway will be described with reference to FIG. 2.

Figure 2:
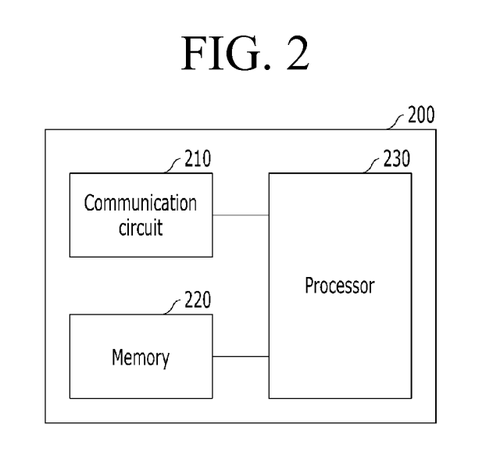
FIG. 2 illustrates a gateway in accordance with at least one embodiment of the present invention.

FIG. 2 illustrates a gateway in accordance with at least one embodiment of the present invention.

Referring to FIG. 2, gateway 200 may include communication circuit 210, memory 220, and processor 230. Communication circuit 210 may receive information, data, and/or signals from and transmit information, data, and/or signal to other entities including smart devices 110-1 to 110-4 and user equipment of an associated user. In particular, communication circuit 210 may receive sensing information of legacy devices 120-1 and 120-2 from smart devices 110-1 to 110-4. Such sensing information of a legacy device 120 may be a sensing result and/or a monitoring result sensed and collected by smart devices 110-1 to 110-4.

Communication circuit 210 may include at least one module for communicating with other entities in the smart home system. For example, communication circuit 210 may include any or all of a broadcasting signal receiving module, a mobile communication module, a wireless internet module, a short-distance communication module, and a location information module (e.g., GPS receiving module). The short-distance communication module may include a Bluetooth circuit, a radio frequency identification (RFID) circuit, an infrared data association (IrDA) circuit, an ultra-wideband (UWB) circuit, a Zigbee circuit, and a near field communication (NFC) module circuit.

Memory 220 may store various information, for example, an operating system for controlling constituent elements, a designated application for providing a smart home service, and information necessary for providing a smart home service. In accordance with at least one embodiment, memory 220 may store a status table of a target legacy device to monitor. For example, the status table of the target legacy device may include information on an output pattern of a legacy device and an operation status mapped to each output pattern of the legacy device. In addition, the status table may further include identification information, location information, and hardware information of the target legacy device, information on related monitoring smart devices selected from smart devices for monitoring the target legacy device, and information on related outputting smart device selected from smart devices 110-1 to 110-4 for outputting an monitoring result, an operation status, and informing message. Furthermore, memory 220 may store location information of a target legacy device, smart devices 110-1 to 110-4, and user equipment of an associated user.

Processor 230 may control associated constituent elements and other entities (e.g., smart devices 110-1 to 110-4) coupled through a communication link established between gateway 200 and smart devices 110-1 to 110-4. For example, processor 230 may be a central control unit (CPU) of gateway 200. Particularly, processor 230 may perform various operations for monitoring a target legacy device using at least one of smart devices 110-1 to 110-4 and for reporting the monitoring result to a designated user through at least one of smart devices 110-1 to 110-4 in accordance with at least one embodiment.

For example, processor 230 may perform a status learning procedure. In the status learning procedure, processor 230 may perform an operation for detecting an output pattern of a target legacy device when the target legacy device perform an operation, matching the detected output pattern with the corresponding operation status of the target legacy device, and recording the detected output pattern in connection with the corresponding operation status in a corresponding status table.

The output pattern is a pattern of outputs produced or generated by the target legacy device when the target legacy device performs a certain operation. Such outputs may include sound, vibration, visual effect, displayed messages, informing voice messages, and so forth. For example, when a washing machine (e.g., 120-2 in FIG. 1) performs a regular washing operation, the washing machine vibrates within a certain vibration range and generates certain sounds produced by a motor and a washing bucket inside the washing machine. Such outputs are generated in a certain pattern. That is, each operation of a legacy device generates a unique output pattern, and an operation status of a legacy device can be distinguishable by a corresponding output pattern. In accordance with at least one embodiment, such an output pattern may be used to monitor a legacy device and to determine an operation status of the legacy device based on the monitored output pattern.

In order to monitor such washing machine 120-2, processor 230 may select smart devices having a vibration sensor for measuring vibration intensity and a microphone for measuring a sound level. Processor 230 may control the selected smart devices to measure the vibration intensity and the sound levels. When processor 230 receives the measured vibration intensity and the measured sound level from the selected smart devices, processor 230 may combine the measurement results (e.g., sensing information) and stores the combined measurement results in a corresponding status table as the output pattern of washing machine.

In particular, processor 230 may create a status table of a target legacy device to monitor and store the created status table in memory 220 in connection with information on a corresponding legacy device. For example, when gateway 200 receives various types of sensing information of a target legacy device to monitor from a user at first time, processor 230 creates a status table for the target legacy device.

After the creation of the status table, processor 230 may select at least one of smart devices 110-1 to 110-4 capable of sensing outputs of the target legacy device (e.g., legacy devices 120-1 and 120-2) in the corresponding home network. Then, processor 230 may control the selected smart devices to monitor the target legacy device. For example, processor 230 controls the selected smart device to sense and to collect outputs of the target legacy device.

Processor 230 may generate an output pattern of the target legacy device by combining monitoring results from the selected monitoring smart devices when the target legacy device performs a certain operation. Furthermore, processor 230 may determine whether the determined output pattern is already included in the status table. That is, processor 230 compares the determined current output pattern with other output patterns recorded in the corresponding status table stored in memory 220. If there is no output pattern identical or similar to the determined output pattern, processor 230 may generate new operation status information and store the generated new operation status information in the status table of the target legacy device in connection with the determined output pattern.

Alternatively, processor 230 may generate new operation status information when the currently determined output pattern is greater than or smaller than previously recorded output patterns as much as a predetermined threshold. Such a predetermined threshold may be set by one of a user, a service provider, a manufacturer, and an operator.

When the operation status is created, a predetermined error range may be considered in accordance with at least one embodiment. For example, the predetermined error range may be about ±5% of each monitoring result. When an output pattern is generated by combining 10 db of sound and 20 Hz of vibration, a corresponding operation status A may be created as output pattern of 10.5 dB to 9.5 dB and 21 Hz to 19 Hz. Similarly, such an error rate may be determined by at least one of a user, a service provider, a manufacturer, and an operator.

Processor 230 may perform a device selection procedure in accordance with at least one embodiment. In the device selection procedure, at least two devices are selected, for example, one as a monitoring smart device for monitoring a target legacy device and the other as an outputting smart device for outputting at least one of a monitoring result and a determined operation status. The monitoring results may be sensing information collected by the monitoring smart devices. The monitoring results may be information on a result of monitoring or sensing a designated type of data output from the target legacy device. The determined operation status may be information on an operation status of the target legacy device, which is determined based on the monitoring result of the target legacy device.

In particular, processor 230 may select at least one of smart devices, as a monitoring smart device, which is capable of sensing a desired type of outputs generated from a target legacy device in a corresponding smart home network. For example, processor 230 may select i) a smart device located within a predetermined distance from a target legacy device, ii) a smart device capable of collecting a desired type of information output from a target legacy device, and iii) a smart device a capable of reporting the collected information to gateway 200. In order to select such a smart device satisfying all or at least one of requirements, processor 230 may use location information of the smart devices and the target legacy device and hardware information of the smart devices. Such location and hardware information may be obtained from a user and stored in memory 220, but the present invention is not limited thereto. Such information may be obtained through various methods, such as communication with user equipment carrying by the user and each smart device.

Furthermore, processor 230 may select at least one of smart devices, as an outputting smart device, which is capable of outputting one of the sensing information and the determined operation status information of the target legacy device to user equipment of a user. For example, processor 230 may select i) a smart device located within a predetermined distance from a user equipment of the designated user, ii) a smart device capable of outputting a desired type of information such as a video data and/or an audio data, and iii) a smart device capable of communicating with gateway 200. In order to select such a smart device, processor 230 may use location information of the smart device and the target legacy device and hardware information of the smart devices, which are stored in memory 220.

Processor 230 may perform an operation status determination procedure for determining a current operation status of a target legacy device based on the sensing information collected from the target legacy device.

Processor 230 may receive sensing information of a target legacy device from at least one of monitoring smart devices (e.g., one selected from the plurality of smart devices) through communication circuit 210. Based on the received sensing information, processor 230 may generate an output pattern by combining the received sensing information.

Based on the generated output pattern, processor 230 may determine a current operation status of a target legacy device. In particular, processor 230 may determine a current output pattern of the target legacy device based on the received sensing information. Processor 230 may search for an operation status mapped to the determined current output pattern of the target legacy device through a status table of the target legacy device, stored in memory 220.

In addition, processor 230 may output at least one of the detected operation statuses and the sensing information of the target legacy device through the outputting smart device (e.g., one selected from the plurality of smart devices in the smart home system). For example, processor 230 may determine whether a current output pattern is matched with any output patterns in a status table of the target legacy device. When the current output pattern of the target legacy device is not matched with any of output patterns in the status table of the target legacy device, processor 230 may create new operation status and stored in a corresponding status table of the target legacy device is abnormal. When the current output pattern is matched with one of output patterns in the status table, processor 230 may perform the device selection procedure for selecting an outputting smart device. After selection, processor 230 may inform of an associated user through outputting an informing message through the selected outputting smart device. For example, processor 230 may control the selected outputting smart device to display a warning message to a user or transmitting a warning message to the user equipment of the associated user.

Such operation may be performed identically or similarly, when the determined current output pattern is not mapped to any of operation statuses in the status table of the target legacy device. However, the present invention is not limited thereto.

The outputting smart device was describing as being controlled to output a predetermined message with the sensing information or the operation status when the determined current operation status or the determined output pattern is not found in the corresponding status table. However, the present invention is not limited thereto. Without determination, processor 230 may control a selected outputting smart device to output a current operation status of the target legacy device or the sensing information of the target legacy device through a designated output device (e.g., a display and/or a speaker) of the selected outputting smart device. That is, although there is no output patterns matched with the current output pattern of the legacy device, processor 230 may control a selected outputting smart device to output a current status or sensing information of the target legacy device through a display of the selected outputting smart device.

Processor 230 may perform a location detection procedure in accordance with at least one embodiment. In the location detection procedure, processor 230 may find a location of a user and obtain information on the location of the user, as user location information, through at least one smart device in a corresponding home network.

For example, processor 230 may request smart devices having an image capturing function to capture images of surroundings. Such a smart device having an image capturing function may include a camera, a smart TV, a robot vacuum, and so forth. Processor 230 may receive the captured images from the predetermined smart devices and analyze the received images to find the location of the user. Alternatively, processor 230 may obtain the user location information from a location detection sensor, installed in the home network system, or directly obtained from the user equipment belonging to the associated user.

As described, gateway 200 performs the status learning procedure for determining an output pattern of each operation status of a target legacy device based on a monitoring result and the device selection procedure for selecting a monitoring smart device and an outputting smart device from smart devices participating in the smart home system in accordance with at least one embodiment. Such operation will be described in detail with reference to FIG. 3.

Figure 3:
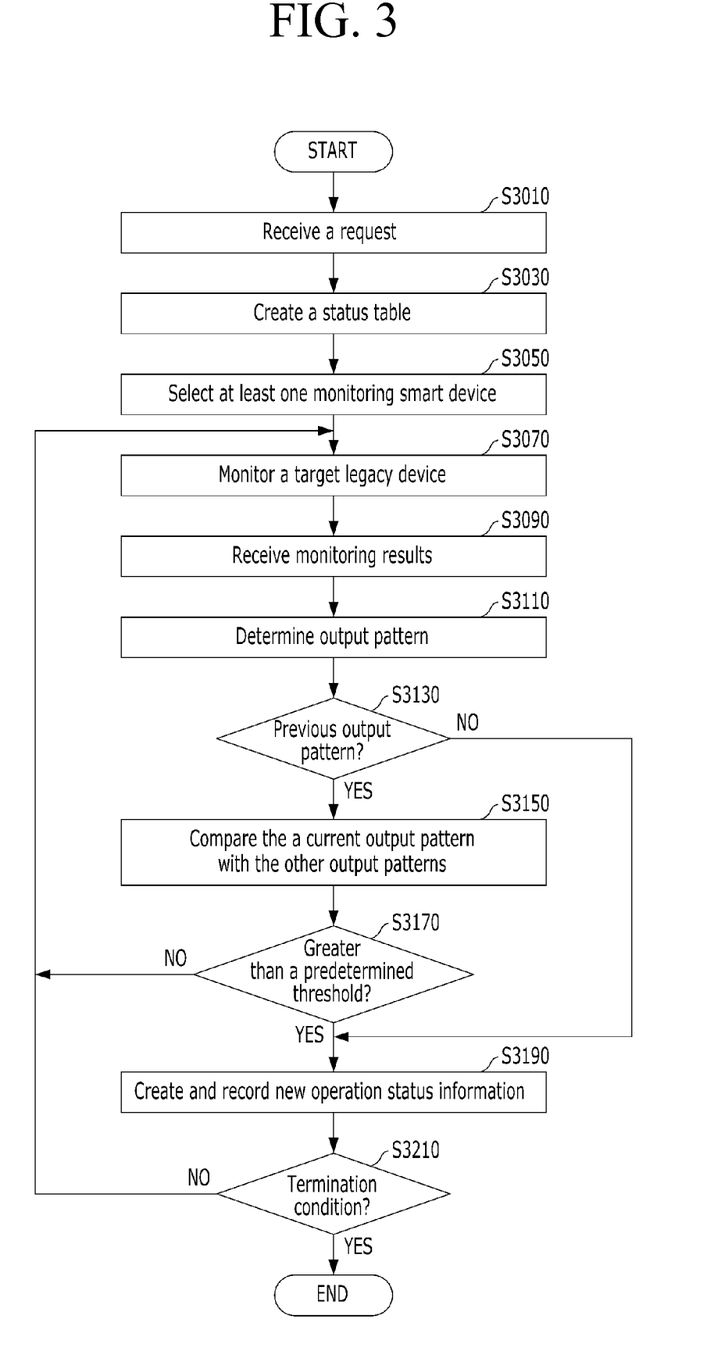
FIG. 3 illustrates a learning procedure and a device selection procedure in accordance with at least one embodiment of the present invention.

FIG. 3 illustrates a learning procedure and a device selection procedure in accordance with at least one embodiment of the present invention.

Referring to FIG. 3, a request to learn an output pattern of each operation status of a target legacy device may be received from an associated user at step S3010. For example, gateway 200 may receive the request from user equipment of an associated user through a communication link established between gateway 200 and the user equipment. Such a request may include the information on the target legacy device, information on at least one of target data types to monitor, and a learning procedure termination condition. The information on the target legacy device may include location information and hardware information on the target legacy device. The hardware information may include identification information on the target legacy device as well as specification of the target legacy device. The at least one of target data types may be at least one of audio, video, vibration, temperature, luminance, and so forth. The learning procedure termination condition may be a time period to perform the learning procedure. For example, a time period may include 10 miniatures, 24 hours, one week, and so forth. Such a time period may be determined by at least one of a user, a service provider, a manufacturer, and an operator.

For example, gateway 200 may provide a user interface that enables an associated user i) to request performing a learning procedure for learning output patterns of operation statuses of a target legacy device; ii) to select, as a target legacy device, one of legacy devices located in a service area of the smart home network; iii) to enter information on at least one of desired data types to monitor, and/or iv) to enter location information and hardware information of a target legacy device. That is, gateway 200 may allow a user registered for a smart home service to access gateway 200 using user equipment through a communication network. Through such access with the user equipment, the user may be provided with a web-based user interface to request performing a learning procedure, to select one of legacy devices in the service area, as a target legacy device, to enter at least one of desired data types to monitor, and/or to enter the location information and the hardware information of a target legacy device. Through such a web-based user interface, gateway 200 may provide map data of legacy devices in a service area of the smart home system. Based on the map data, an associated user may select a target legacy device to monitor and enter the location information and the hardware information thereof.

Alternatively, gateway 200 may provide a service application to user equipment of an associated user. That is, the associated user downloads, using user equipment, the service application from gateway 200 or a related system through a communication network. The downloaded application is installed in the user equipment. Upon execution of the installed application, a graphic user interface may be produced and displayed on the user equipment. After establishing a communication link between gateway 200 and the user equipment, the associated user interacts with gateway 200 through the graphic user interface for requesting performing a learning procedure, selecting a target legacy device, entering information on at least one of desired data types to monitor, and/or entering location information and hardware information of a target legacy device in the smart home system. Furthermore, gateway 200 may provide various types of information (e.g., map data of legacy devices) to the associated user through the graphic user interface displayed on the user equipment for enabling the associated user to monitor a target legacy device and to be informed of a user with a warning message when an operation status of the target legacy device is abnormal.

At step S3030, a status table of the target legacy device may be created. For example, processor 230 may create the status table of the target legacy device based on the information received from the associated user. When the status table is initially created, the status table may have fields for and store information on output patterns, operation statuses related to respective output pattern, identification of a related target legacy device, associated monitoring smart devices which are previously selected to monitor the target legacy device, associated outputting smart devices which are previously selected to output information on the target legacy device, and so forth. Since the status table of the target legacy device is initially created, the created status table may store no information but fields.

At step S3050, at least one monitoring smart device may be selected. For example, processor 230 may select at least one of smart devices in the smart home system to monitor the target legacy device, as a monitoring smart device. In particular, processor 230 may select at least one smart device which is capable of sensing one of the desired data types of outputs generated from a target legacy device in a corresponding smart home network. Processor 230 may select a smart device satisfying following requirements, such as i) a smart device located within a predetermined distance from a target legacy device, ii) a smart device (or, having at least one constituent elements) capable of collecting one of the desired data types of information output from a target legacy device, and iii) a smart device a capable of reporting the collected information to gateway 200. In order to select such a smart device satisfying all or at least one of requirements, processor 230 may use location information of the smart devices and the target legacy device and hardware information of the smart devices. Such location and hardware information may be obtained directly from a user through a predetermined user interface or fetched from memory 220, but the present invention is not limited thereto. Such information may be obtained through various methods, such as communication with user equipment carrying by the user and each smart device.

At step S3070, the selected at least one monitoring smart device may be controlled to monitor the target legacy device. For example, processor 230 may generate command signals based on information included in the request or in response to a user command received through the associated user equipment. Processor 230 may transmit the generated command signals to the selected at least one monitoring smart device through communication circuit 210. The command signal may include information on a target legacy device to monitor, a desired data type of information to collect from the target legacy device, a time interval to monitor the target device or to transmit the collected information to gateway 200, and so forth.

In response to the command signals, the selected monitoring smart devices monitor the target legacy device and collect the desired data types of information from the target legacy device, as monitoring results. Then, the selected monitoring smart devices regularly transmit the collected information (e.g., sensing information) to gateway 200 through a communication link.

At step S3090, the monitoring results may be received. For example, processor 230 may receive the monitoring results (e.g., sensing information) from the selected monitoring smart devices through communication circuit 210. The monitoring results may include sensing information. The sensing information may be measurement of the desired data types of information sensed from the target legacy device when the target legacy device performs a related operation. In particular, the sensing information may be video data, audio data, vibration intensity of vibration, and/or a sound level of sound outputted from the target legacy device when the related operation is performed. Furthermore, the sensing information may include vibration intensity, luminance level, and temperature of the target legacy device. Such desired data types of information may be generated differently according to a type of a target legacy device and a type of an operation to monitor. Accordingly, each one of the measured data in sensing information or the combination of a plurality of the measured data in sensing information can be used to distinguish an operation status of the target legacy device.

At step S3110, an output pattern may be determined based on the received monitoring results. For example, processor 230 may determine the output pattern of the target legacy device by combining the desired data types of sensing information received from at least one of monitoring smart devices. When a washing machine (e.g., 120-2 in FIG. 1) is selected as the target legacy device to monitor and when vibration and sound are selected as desired data types to monitor, processor 230 may receive measured vibration intensity (e.g., about 20 Hz) and measured sound level (e.g., 20 dB) from at least one of selected monitoring smart devices (e.g., vibration sensor 110-4 and a microphone of smart TV 110-2). Processor 230 may combine the received vibration intensity and sound level as an output pattern of the target legacy device. That is, the output pattern of the target legacy device may be 20 Hz:20 dB (vibration intensity: sound level).

In the determination of the output pattern, a predetermined error range may be considered in accordance with at least one embodiment. For example, about ±5% of measurement may be considered as the predetermined error range. That is, when the measured sound level is about 20 dB, the sound level of the output pattern may be determined as 18.5 dB to 21.5 dB. When the measured vibration intensity is about 20 Hz, the vibration intensity of the output pattern may be determined as 19 Hz to 21 Hz. Such an error range may be determined by at least one of a user, a service provider, an operator, and a manufacturer.

At step S3130, determination may be made so as whether other output patterns associated with the target legacy device are previously recorded in the status table of the target legacy device. For example, such operation may be performed by processor 230 based on information stored in memory 220 as well as the status table of the target legacy device.

When the other output patterns are not previously recorded (No—S3130), new operation status may be created and recorded in connection with the determined output pattern at step S3190. For example, when the other output patterns associated with the target legacy device are not stored in the status table of the target legacy device, processor 230 creates new operation status information for the determined output pattern. Processor 230 maps the created new operation status information to the determined output pattern and stored in the status table of the target legacy device with the mapping information.

For example, processor 230 may name the new operation status as a first operation status and store the first operation status with the determined output pattern (18.5 dB to 2.5 dB:19 Hz to 21 Hz) in the status table of the target legacy device. After creation, processor 230 may inquiry an associated user to name the first operation status and update the first operation status based on a user input in response to the inquiry. For example, the user input may be "normal drying operation." In this case, processor 230 may update the name of the first operation status as "normal drying operation."

When the other output patterns associated with the target legacy device are previously recorded (Yes—S3130), the determined current output pattern may be compared with the other output patterns of the target legacy device at step S3150. For example, such comparison operation may be performed by processor 230 based on other output patterns previously recorded and stored in the status table of the target legacy device.

At step S3170, determination may be made so as whether a difference between the current output pattern and the other output patterns is greater than a predetermined threshold. For example, processor 230 determines whether the difference between the currently determined output pattern and the other output patterns in the same status table is greater than a predetermined threshold. In order to determine, each measurement in the current output pattern may be compared corresponding measurement in the previous output pattern. That is, vibration intensity in the current output pattern is compared with vibration intensity in the previous output pattern, and a sound level in the current output pattern is compared with a sound level in the previous output pattern. The predetermined threshold may differ according to various factors, such as a target legacy device to monitor, a target operation to monitor, a target data type to monitor, and so forth. Such a predetermined threshold may be decided and set by at least one of a manufacturer, a service provider, a user, and an operator.

When the difference is not greater than the predetermined threshold (No—S3170), the target legacy device is continuously monitored at step S3070. For example, processor 230 determines that an operation status of the target legacy device is not changed when the difference is not greater than the predetermined threshold. That is, when processor 230 determines that the operation status is not changed, processor 230 continuously controls the selected monitoring smart devices to monitor the target legacy device at step S3070.

When the difference is greater than the predetermined threshold (Yes—S3170), new status information may be created and recorded at step S3190. For example, when the difference is greater than the predetermined threshold, processor 230 determines that an operation status of the target legacy device is changed. Accordingly, processor 230 creates new operation status information. Processor 230 maps the created new operation status information to the determined output pattern and stored in the status table of the target legacy device with the mapping information.

At step S3210, determination may be made so as whether a termination condition is satisfied. For example, processor 230 determines whether a time period of the learning procedure is expired or not. Such a time period may be set based on the request received from the user equipment of the associated user at the step S3010. However, the present invention is not limited thereto. The termination condition may be set with various conditions, such as a time of recording new operation status, receipt of a termination signal from the user equipment, initiation of a predetermined event, and so forth.

When the termination condition is not satisfied (No—S3210), the target legacy device is continuously monitored at step S3070. When the termination condition is satisfied (Yes—S3210), the learning procedure may be terminated.

As described, in the step S3150, processor 230 may compare a currently determined output pattern with a previously determined output pattern received from the same monitoring smart device (e.g., monitoring smart devices sensing the same data type). That is, three different types of data (e.g., vibration, temperature, and sound) may be collected for monitoring one target legacy device. In case of vibration data, a currently determined vibration output pattern is compared with a previously collected vibration output pattern received from the same monitoring smart device. When the difference between the currently determined vibration output pattern and the previously collected vibration output patter is greater than a predetermined threshold (e.g., about 10 Hz), processor 230 may determine that a new operation status is generated, creates information on the new operation status, store the created new operation status in a corresponding status table in connection with the currently determined vibration output pattern. However, the present invention is not limited thereto. For example, all three of the desired type of data must be greater than a corresponding predetermined threshold to determine such change as the new operation status. Alternatively, at least one of three desired types of data must be greater than a corresponding predetermined threshold to determine such change as the new operation status.

In case of sound data, a currently determined sound output pattern (e.g., sound level dB) is compared with a previously collected sound output pattern (e.g., sound level dB) received from the same monitoring smart device. When the difference between the currently determined sound output pattern and the previously collected sound output patter is greater than a corresponding predetermined threshold (e.g., about 5 dB), information on a new operation status may be generated and recorded.

Based on the created new operation status and the determined output patterns, the status table of the target legacy device may be created. Table 1 shows an example of a status table of a legacy device.

TABLE 1

| Operation Status | Sound level | Vibration intensity |
| --- | --- | --- |
| First operation status (Turn-Off status) | 0 dB | 0 Hz |
| Second operation status (Normal Dry operation) | 18.5 dB-21.5 dB | 19 Hz-21 Hz |
| Third operation status (Heavy Washing operation) | 28.5 dB-31.5 dB | 23.75 Hz-26.25 Hz |

Referring to Table 1, Table 1 shows a status table for a washing machine as a target legacy device. The status table may include an output formed of a sound level and a vibration intensity and a corresponding operations status. For example, when the washing machine does not output any data (such as 0 dB and 0 Hz), gateway 200 may determine such output pattern as a first operation status and record the first operation status with the output pattern of 0 dB: 0 Hz. When the washing machine output sound at 20 dB and generate vibration at 20 Hz, gateway 200 may determine such output pattern as a second operation status and record the second operation status with the output pattern of 18.5 dB to 21.5 dB: 19 Hz to 21 Hz in consideration of an error of about ±5% of measurement as an error range.

Furthermore, when the washing machine output sound at 30 dB and generate vibration at 25 Hz, gateway 200 may determine such output pattern as a third operation status and record the third operation status with the output pattern of 28.5 dB to 31.5 dB:23.75 Hz to 26.25 Hz in consideration of an error of about ±5% of measurement as an error range.

In addition, such first, second, and third operation statuses may be renamed in response to a user input. For example, upon the determination of a certain output pattern as a new operation status, an associated user may be requested to name the new operation status through a predetermined user interface. That is, the first operation status may be renamed as a turn-off status, the second operation status may be renamed as a Normal dry operation, and the third operation status may be renamed as a Heavy washing operation. However, the present invention is not limited thereto.

In another embodiment, such a name of operation status may be determined based on information selected from the target legacy device using at least one smart devices located around the target legacy device. For example, selected monitoring smart devices located around the target legacy device recognize a voice message or a visual message output from the target legacy device. That is, the microphone of smart TV 110-1 in FIG. 1 may recognize a voice message of "Dry operation starts" output from washing machine 120-2. Security camera 110-3 may capture an image of washing machine 120-2's an indication light of a heavy washing operation turned-on. Furthermore, a camera of smart TV 110-1 may capture a message "a normal washing operation is completed" displayed on a display panel of washing machine 120-2. Such detections may be transmitted to gateway 200 and gateway 200 may use such information to name each operation status to be meaningful to an associated user.

Figure 4:
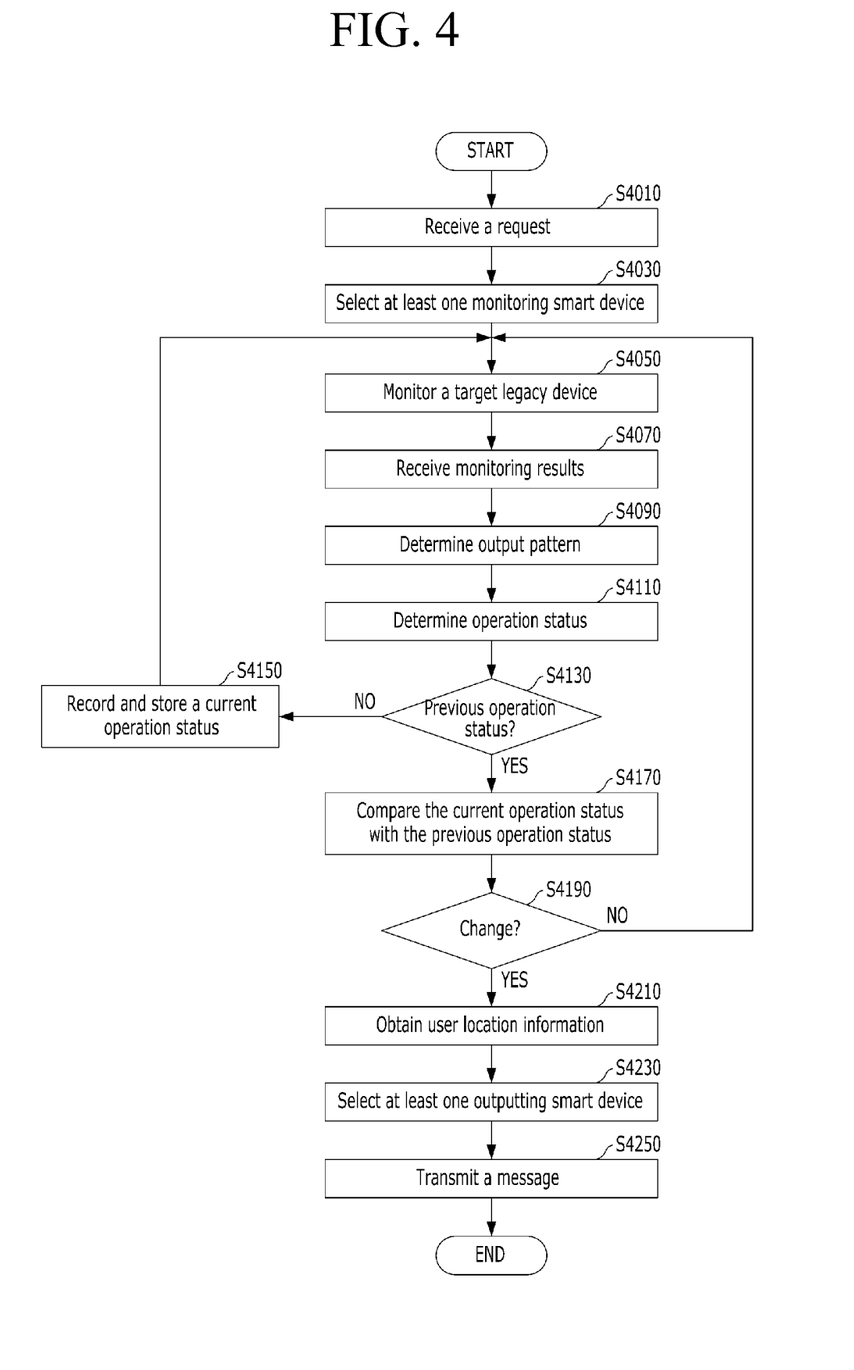
FIG. 4 illustrates a method for monitoring a legacy device in accordance with at least one embodiment.

After creating the status table of the target legacy device, the target legacy device may be monitored to detect an operation status change or an abnormal operation status in accordance with at least one embodiment. Such monitoring operation will be described with reference to FIG. 4. In FIG. 4, for convenience and ease of understating, the monitoring operation will be described as detecting an operation status change, but the present invention is not limited thereto. The monitoring operation may be similarly performed to detect an abnormal operation status.

FIG. 4 illustrates a method for monitoring a legacy device in accordance with at least one embodiment.

Referring to FIG. 4, a request to monitor a target legacy device may be received from an associated user at step S4010. For example, gateway 200 may receive the request from user equipment of an associated user through a communication link established between gateway 200 and the user equipment. Such a request may include the information on the target legacy device and information on a target data type to monitor. The information on the target legacy device may include location information and hardware information on the target legacy device. The hardware information may include identification information on the target legacy device as well as specification of the target legacy device.

For example, gateway 200 may provide a user interface that enables an associated user i) to request monitoring a target legacy device; ii) to select, as a target legacy device, one of legacy devices located in a service area of the smart home network; and/or iii) to enter location information and hardware information of a target legacy device. That is, gateway 200 may allow a user registered for a smart home service to access gateway 200 using user equipment through a communication network. Through such access with the user equipment, the user may be provided with a web-based user interface to request performing a monitoring procedure, to select one of legacy devices in the service area, as a target legacy device, and/or to enter the location information and the hardware information of a target legacy device. Through such a web-based user interface, gateway 200 may provide map data of legacy devices in a service area of the smart home system. Based on the map data, an associated user may select a target legacy device to monitor and enter the location information and the hardware information thereof.

Alternatively, gateway 200 may provide a service application to user equipment of an associated user. That is, the associated user downloads, using user equipment, the service application from gateway 200 or a related system through a communication network. The downloaded application is installed in the user equipment. Upon execution of the installed application, a graphic user interface may be produced and displayed on the user equipment. After establishing a communication link between gateway 200 and the user equipment, the associated user interacts with gateway 200 through the graphic user interface for requesting performing a monitoring procedure, selecting a target legacy device, and/or entering location information and hardware information of a target legacy device in the smart home system. Furthermore, gateway 200 may provide various types of information (e.g., map data of legacy devices) to the associated user through the graphic user interface displayed on the user equipment for enabling the associated user to monitor a target legacy device and to be informed of a user with a warning message when an operation status of the target legacy device is abnormal.

At step S4030, at least one monitoring smart device may be selected. For example, processor 230 may select at least one of smart devices in the smart home system to monitor the target legacy device, as a monitoring smart device. In particular, processor 230 may select at least one smart device which is capable of sensing a desired type of outputs generated from a target legacy device in a corresponding smart home network. Processor 230 may select a smart device satisfying following requirements, such as i) a smart device located within a predetermined distance from a target legacy device, ii) a smart device capable of collecting a desired type of information output from a target legacy device, and iii) a smart device capable of reporting the collected information to gateway 200. In order to select such a smart device satisfying all or at least one of requirements, processor 230 may use location information of the smart devices and the target legacy device and hardware information of the smart devices. Such location and hardware information may be obtained directly from a user through a predetermined user interface or fetched from memory 220, but the present invention is not limited thereto. Such information may be obtained through various methods, such as communication with user equipment carrying by the user and each smart device.

At step S4050, the selected monitoring smart device may be controlled to monitor the target legacy device. For example, processor 230 may generate command signals based on information included in the request or in response to a user command received through the associated user equipment. Processor 230 may transmit the generated command signals to the selected monitoring smart device through communication circuit 210. The command signal may include information on a target legacy device to monitor, a desired type of information to collect from the target legacy device, a time interval to monitor the target device or to transmit the collected information to gateway 200, and so forth.

In response to the command signals, the selected monitoring smart device monitors the target legacy device and collects the desired type of information from the target legacy device, as a monitoring result. Then, the selected monitoring smart device regularly transmits the collected information (e.g., sensing information) to gateway 200 through a communication link.

At step S4070, the monitoring result may be received. For example, processor 230 may receive the monitoring result (e.g., sensing information) from the selected monitoring smart devices through communication circuit 210. The monitoring result may include sensing information and operation information. The operation information denotes information on a related operation performed by the target legacy device. The sensing information may be measurement of the desired data sensed from the target legacy device when the target legacy device performs the related operation. In particular, the sensing information may be video data or audio data outputted from the target legacy device when the related operation is performed. Furthermore, the sensing information may be vibration, luminance, and temperature of the target legacy device. Such a desired type of data may be generated differently according to a type of a target legacy device and a type of an operation to monitor.

At step S4090, an output pattern may be determined based on the received monitoring result. For example, processor 230 may combine the monitoring results received from the monitoring smart devices and determine the output pattern of the target legacy device.

At step S4110, an operation status may be determined based on the determined output pattern. For example, processor 230 determines the operation status by comparing the determined current output pattern with the output patterns stored in the status table of the target legacy device. That is, processor 230 finds one of output patterns in the status table, matched with the determined current output pattern and finds an operation status mapped to the found output pattern. Processor 230 determines the mapped operation status as the current operation status of the target legacy device.

At step S4130, determination may be made so as whether a previous operation status is stored. For example, processor 230 determines whether a previous operation status was determined and stored in memory 220.

When the previous operation status was not stored (No—S4130), the current determined operation status may be recorded and stored at step S4150 and the target legacy device may be continuously monitored at step S4050. For example, if the previous operation status was not stored, processor 230 stores the current determined operation status in a predetermined sector of memory 220, as a previous operation status, and continuously controls the selected monitoring smart devices to monitor the target legacy device.

When the previous operation status is stored (Yes-S4130), the current determined operation status may be compared with the previous operation status at step S4170. For example, processor 230 compares the current determined operation status of the target legacy device with the previous operation status of the target legacy device if the previous operation status of the target legacy device was recorded and stored in memory 220.

At step S4190, determination may be made so as whether the operation status of the target legacy device is changed. For example, processor 230 determines whether the current operation status is matched with the previous operation status.

When the operation status is not changed (No—S4190), the target legacy device may be continuously monitored at step S4050. When the operation status is changed (Yes-S4190), a user location information may be obtained at step S4210. For example, processor 230 initiates a procedure for selecting at least one outputting smart device from smart devices participating in the smart home system when the operation status of the target legacy device is changed. Upon the initiation of the procedure, a location of a user is detected. In order to detect the user location, the user location information is obtained.

Such user location information may be obtained in various ways. The user location information may be obtained directly from an associated user through user equipment the associated user has. The user location information may be received from the user when the user requests the monitoring procedure and the received user location information may be stored in memory 220. In this case, processor 230 may fetch the user location information from memory 220. Furthermore, the user location information may be obtained by controlling at least one of smart devices participating in the smart home system. For example, processor 230 may select image capturing devices, such as a camera, a smart TV, a robot vacuum) from smart devices in the smart home system and control the selected image capturing device to capture images of surroundings. Processor 230 may analyze the captured images and determine a location of a user based on the analysis result.

At step S4230, at least one outputting smart device may be selected. For example, processor 230 selects at least one of smart devices, as an outputting smart device, which is capable of outputting one of the sensing information and the determined operation status information of the target legacy device to user equipment of a user. For example, processor 230 may select i) a smart device located within a predetermined distance from a user equipment of the designated user, ii) a smart device capable of outputting a desired type of information such as a video data and/or an audio data, and iii) a smart device capable of communicating with gateway 200. In order to select such a smart device, processor 230 may use the obtained user location information, and the location information of the smart device and the target legacy device and hardware information of the smart devices, which are stored in memory 220.

At step S4250, a message may be transmitted to the outputting smart device and displayed through a designated output circuit of the outputting smart device. For example, processor 230 generates a message for informing the operation status change and transmits the generated message to the selected outputting smart device. Processor 230 controls the selected outputting smart device to output the generated message. That is, the outputting smart device may display the message through a display or output the message through a speaker.

Figure 5:
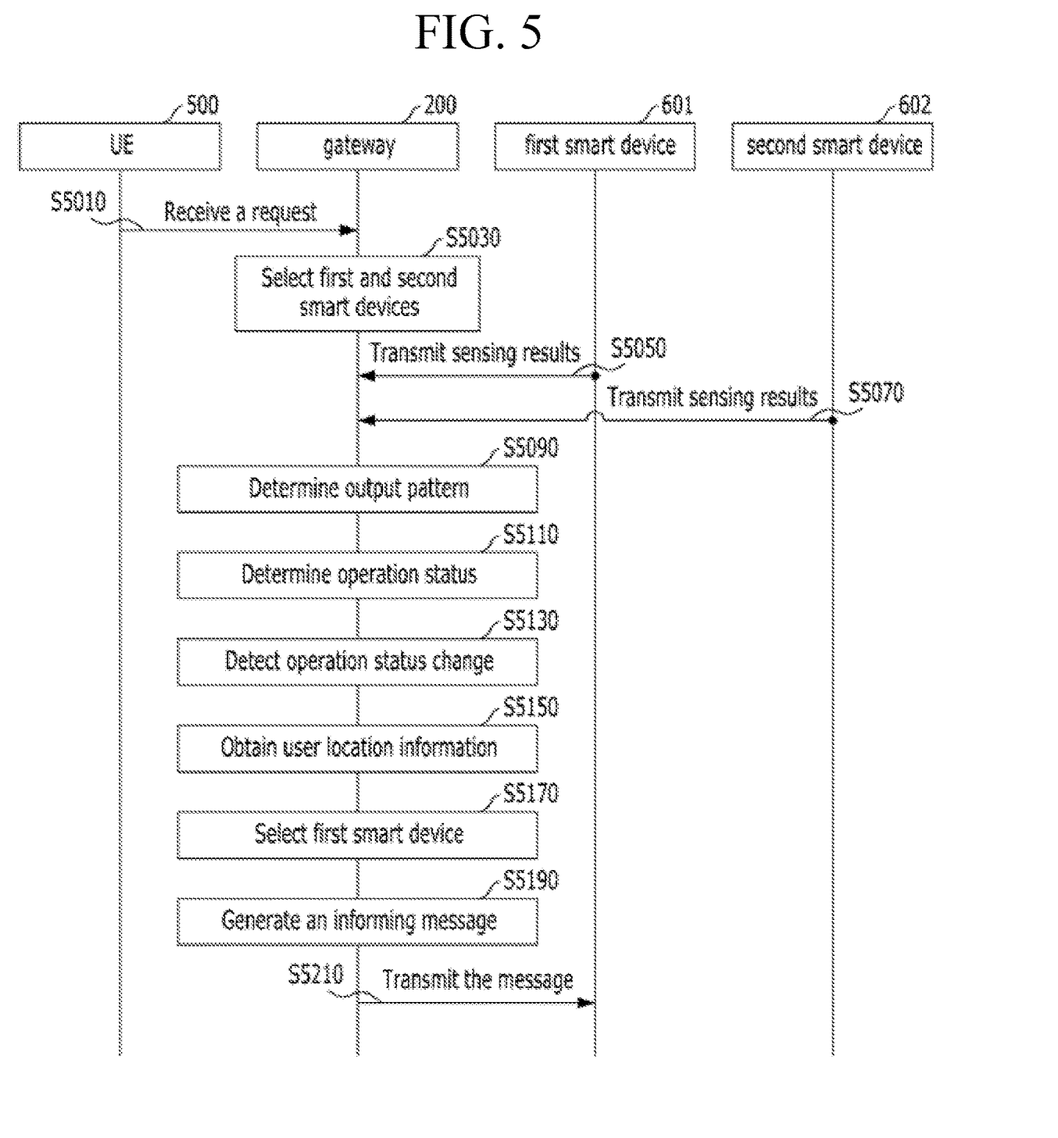
FIG. 5 illustrates an example of monitoring a legacy device using at least one smart device participating in a smart home system in accordance with at least one embodiment of the present invention.

FIG. 5 illustrates an example of monitoring a legacy device using at least one smart device participating in a smart home system in accordance with at least one embodiment of the present invention.

Referring to FIG. 5, gateway 200 may receive a request to monitor a target legacy device from user equipment of an associated user through a communication link established between gateway 200 and the user equipment at step S5010.

At step S5030, gateway 200 may select a first smart device 601 and a second smart device 602, as monitoring smart devices. At steps S5050 and S5070, the first smart device 601 and the second smart device 602 sense outputs of the target legacy device and transmits the sensing results (e.g., monitoring results) to gateway 200.

At step S5090, gateway 200 may combine the sensing results received from the first smart device 601 and the second smart device 602 and determine the output pattern of the target legacy device. At step S5110, gateway 200 may determine the operation status by comparing the determined current output pattern with the output patterns stored in the status table of the target legacy device. That is, processor 230 finds one of output patterns in the status table, matched with the determined current output pattern and finds an operation status mapped to the found output pattern. Processor 230 determines the mapped operation status as the current operation status of the target legacy device.

At step S5130, gateway 200 determines whether the current operation status of the target legacy device is changed. That is, gateway 200 may compare the current operation statue of the target legacy device with a previous operation status of the target legacy device, which may be stored in memory 220 of gateway 200. When the operation status is not changed, the target legacy device may be continuously monitored.

When the operation status is changed, gateway 200 may obtain user location information at step S5150. Such user location information may be obtained in various ways. The user location information may be obtained directly from an associated user through user equipment the associated user has. The user location information may be received from the user when the user requests the monitoring procedure and the received user location information may be stored in memory 220. Furthermore, the user location information may be obtained by controlling at least one of smart devices participating in the smart home system. For example, processor 230 may select image capturing devices, such as a camera, a smart TV, a robot vacuum) from smart devices in the smart home system and control the selected image capturing device to capture images of surroundings. Processor 230 may analyze the captured images and determine a location of a user based on the analysis result.

At step S5170, gateway 200 may select the first smart device as an outputting smart device, which is capable of outputting one of the sensing information and the determined operation status information of the target legacy device to user equipment (UE) 500.

At step S5190, gateway 200 may generate a message for informing the operation status change and transmits the generated message to first smart device 601 (e.g., the selected outputting smart device). At step S5210, gateway 200 may control first smart device 601 to output the generated message.

As described, gateway 200 determines whether an operation status of the target legacy device is changed by comparing the current operation status with the previous operation status in accordance with at least one embodiment. However, such operation may be omitted in accordance with another embodiment. For example, without determining whether the operation status of the target legacy device is changed, the operation status is determined based on the output pattern of the target legacy device and the determined operation status may be transmitted to the outputting smart device.

Furthermore, in still another embodiment, an operation status of a legacy device may be instantly monitored using sensors mounted on smart devices participating in a smart home system and the monitored operations status may be output through an output circuit of at least one smart device. In this embodiment, an output pattern of a legacy device is not determined and not compared. Such operation will be described with reference to FIG. 6.

Figure 6:
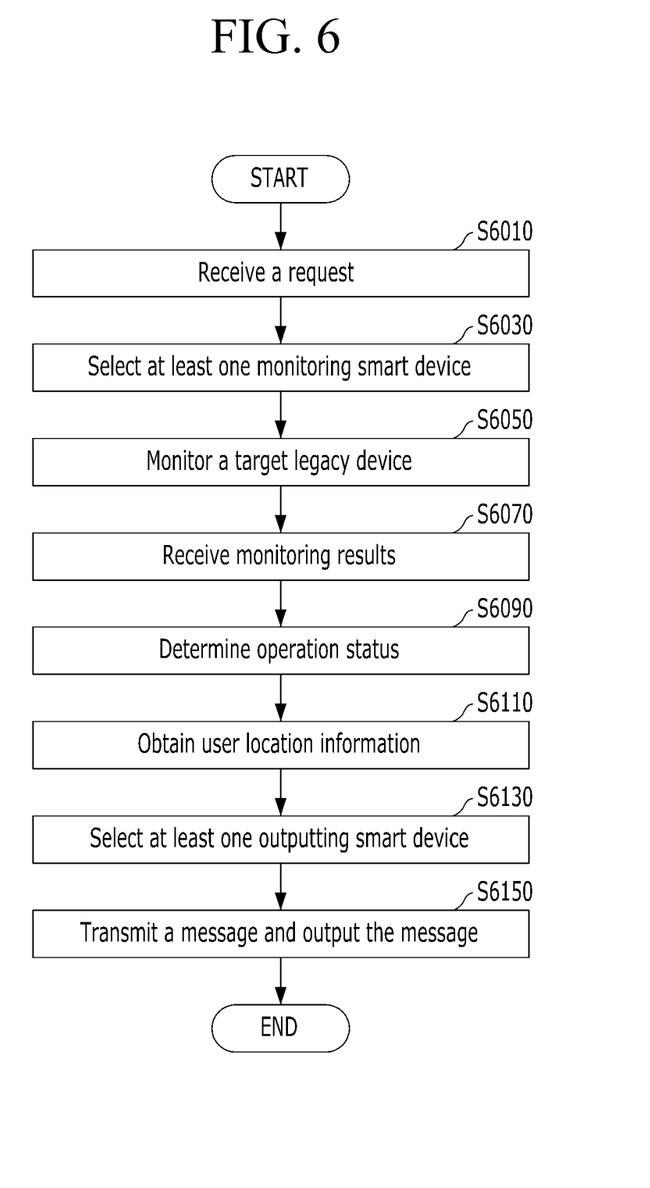
FIG. 6 illustrates a method for monitoring a legacy device in accordance with another embodiment.

FIG. 6 illustrates a method for monitoring a legacy device in accordance with another embodiment.

Referring to FIG. 6, a request to monitor a target legacy device may be received from an associated user at step S6010. For example, gateway 200 may receive the request from user equipment of an associated user through a communication link established between gateway 200 and the user equipment. Such a request may include the information on the target legacy device and information on a target data type to monitor. The information on the target legacy device may include location information and hardware information on the target legacy device. The hardware information may include identification information on the target legacy device as well as specification of the target legacy device.

At step S6030, at least one monitoring smart device may be selected. For example, processor 230 may select at least one of smart devices in the smart home system to monitor the target legacy device, as a monitoring smart device. In particular, processor 230 may select at least one smart device which is capable of sensing video data and audio data generated from a target legacy device in a corresponding smart home network.

Processor 230 may select a smart device satisfying following requirements, such as i) a smart device located within a predetermined distance from a target legacy device, ii) a smart device capable of collecting video data and audio data output from a target legacy device, and iii) a smart device a capable of reporting the collected information to gateway 200. In order to select such a smart device satisfying all or at least one of requirements, processor 230 may use location information of the smart devices and the target legacy device and hardware information of the smart devices. Such location and hardware information may be obtained directly from a user through a predetermined user interface or fetched from memory 220, but the present invention is not limited thereto. Such information may be obtained through various methods, such as communication with user equipment carrying by the user and each smart device.

At step S6050, the selected monitoring smart device may be controlled to monitor the target legacy device. For example, processor 230 may generate command signals based on information included in the request or in response to a user command received through the associated user equipment. Processor 230 may transmit the generated command signals to the selected monitoring smart device through communication circuit 210. The command signal may include information on a target legacy device to monitor, a desired type of information to collect from the target legacy device, a time interval to monitor the target device or to transmit the collected information to gateway 200, and so forth.

In response to the command signals, the selected monitoring smart device monitors the target legacy device and collects the desired type of information from the target legacy device, as a monitoring result. Then, the selected monitoring smart device regularly transmits the collected video and audio information (e.g., sensing information) to gateway 200 through a communication link.

At step S6070, the monitoring result may be received. For example, processor 230 may receive the monitoring result (e.g., video data and audio data) from the selected monitoring smart devices through communication circuit 210. At step S6090, an operation status of a target legacy device may be determined based on the received monitoring result. For example, the monitoring smart device may detect images displayed on a display device of the target legacy device. That is, the monitoring smart device may use a mounted camera device to capture a "off" indicate light turned-on. Such a captured image is transmitted to gateway 200 and gateway 200 may determine an operation status of the target legacy device as off. Furthermore, the monitoring smart device may sense audio data output from the target legacy device. That is, the monitoring smart device may use a mounted microphone to detect an informing voice of "a cooking process is completed" from the target legacy device. Such a detected voice is transmitted to gateway 200 and gateway 200 may determine an operation status of the target legacy device as completion of the cooking process.

At step S6110, user location information may be obtained. For example, processor 230 initiates a procedure for selecting at least one outputting smart device from smart devices participating in the smart home system when the operation status of the target legacy device is determined. Upon the initiation of the procedure, a location of a user is determined. In order to determine the user location, the user location information is obtained.

At step S6130, at least one outputting smart device may be selected. For example, processor 230 selects at least one of smart devices, as an outputting smart device, which is capable of outputting one of the sensing information and the determined operation status information of the target legacy device to user equipment of a user. For example, processor 230 may select i) a smart device located within a predetermined distance from a user equipment of the designated user, ii) a smart device capable of outputting a desired type of information such as a video data and/or an audio data, and iii) a smart device capable of communicating with gateway 200. In order to select such a smart device, processor 230 may use the obtained user location information, and the location information of the smart device and the target legacy device and hardware information of the smart devices, which are stored in memory 220.

At step S6150, a message may be transmitted to the outputting smart device and displayed through a designated output circuit of the outputting smart device. For example, processor 230 generates a message for informing the operation status change and transmits the generated message to the selected outputting smart device. Processor 230 controls the selected outputting smart device to output the generated message. That is, the outputting smart device may display the message through a display or output the message through a speaker.

For example, the monitored operation status of the target legacy device may be reprocessed to (e.g., reformatted to) an informing message in order to be output through a designated device of the outputting smart device. In case of capturing an image of a completion message displayed on a display circuit of the target legacy device, such a captured image may be displayed through the outputting smart device. Alternatively, the captured image may be reformatted to an informing voice message and the informing voice message may be output through a speaker of the outputting smart device.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for monitoring a legacy device located in a service area of a smart home automation system using smart devices in the smart home automation system, the method comprising:
    selecting a smart device among a plurality of smart devices in the smart home automation system to monitor the legacy device, wherein the smart device is a smart home appliance, wherein the plurality of smart devices communicate with each other and at least one of the plurality of the smart devices performs the monitoring of the legacy device, and wherein the legacy device is incapable of communicating with other devices located in the service area of the smart home automation system;
    transmitting, by the smart home automation system, a command signal to control the selected smart device to monitor the legacy device by collecting data outputted from the legacy device;
    monitoring the legacy device by the selected smart device, wherein the monitoring results include at least one of a sound level measured from the legacy device, a vibration intensity measured from the legacy device, a temperature measured from the legacy device, an image capturing at least one part of the legacy device, a video data capturing at least one part of the legacy device, audio data outputted from the legacy device, and a combination thereof;
    receiving, by the smart home automation system from the selected smart device, monitoring results for the legacy device from the selected smart device; and
    determining, by the smart home automation system, an output pattern of the legacy device based on the received monitoring results, and detecting an operation status of the legacy device by comparing the determined output pattern with a status table, wherein the status table includes information on an output pattern of the legacy device and an operation status mapped to each output pattern of the legacy device.

2. The method of claim 1, wherein the monitoring results is collected using at least one constituent element of a corresponding monitoring smart device.

3. The method of claim 1, wherein the selecting the smart devices include:
    a smart device located within a predetermined distance from the legacy device;
    a smart device capable of collecting a corresponding type of data output from the legacy device; and
    a smart device capable of communicating to other entities in the smart home automation system.

4. The method of claim 1, wherein the controlling includes:
    generating a control signal to include information on the legacy device, a type of data to collect from the legacy device, a time interval to collect, and a destination to transmit the collected type of data; and
    transmitting the generated control signal to the selected monitoring smart devices.

5. The method of claim 1, further comprising:
    receiving a monitoring request from user equipment associated with a user, wherein the monitoring request includes information on the legacy device and a type of data to be collected from the legacy device.

6. The method of claim 1, wherein the determining an output pattern of the legacy device includes:
    combining the received monitoring results, as the output pattern of the legacy device, and wherein the received monitoring results includes different types of data and collected using at least one constituent element of a corresponding one of the monitoring smart devices.

7. The method of claim 1, wherein the detecting an operation status of the legacy device includes:
    detecting an output pattern in the status table, which is matched with the determined output pattern based on the comparison result;
    obtaining an operation status mapped to the detected output pattern; and
    identifying the obtained operation status as a current operation status of the target legacy device.

8. The method of claim 1, comprising:
    providing the detected operation status of the legacy device to an associated user through user equipment of the associated user.

9. The method of claim 8, wherein the providing includes:
    comparing the detected operation status with a previous operation status; and
    when the detected operation status is different from the previous operation status, providing the detected operation status of the legacy device to an associated user through user equipment of the associated user.

10. The method of claim 8, wherein the providing includes:
    selecting a smart device from the plurality of smart devices as an outputting smart device;
    transmitting information on the detected operation status to the selected outputting smart device; and
    controlling the selected outputting smart device to output the transmitted information through at least one constituent element of the selected outputting smart device.

11. The method of claim 10, wherein the selecting the outputting smart device includes:

a smart device located within a predetermined distance from an associated user;

a smart device capable of outputting a corresponding type of data output from the legacy device; and a smart device capable of communicating to other entities in the smart home automation system.

12. The method of claim 1, further comprising:

receiving a learning request from user equipment associated with a user, wherein the learning request includes information on the legacy device, types of data to be collected from the legacy device, and a learning procedure termination condition; and creating the status table of the legacy device, wherein the status table includes information on data fields and information on at least one for output patterns, operation statuses, and identification of the legacy device, associated monitoring smart devices, and associated outputting smart devices.

13. The method of claim 12, whether the determining an output pattern of the legacy device includes:

creating an operation status of the legacy device; and storing the created operation status in the status table of the legacy device in connection with the determined output pattern.

14. The method of claim 12, after the determining an output pattern, comprising:

determining whether the determined output pattern is greater than a predetermined threshold; and creating an operation status of the legacy device when the determined output pattern is greater than the predetermined threshold, and wherein the output pattern is one of a sound level measured from the legacy device, a vibration intensity measured from the legacy device, a temperature measured from the legacy device, an image capturing at least one part of the legacy device, a video data capturing at least one part of the legacy device, and audio data outputted from the legacy device.

15. A method for monitoring a legacy device located in a service area of a smart home automation system using smart devices in the smart home automation system, the method comprising:

receiving, by the smart home automation system, a monitoring request to monitor the legacy device from user equipment associated with a user, where the monitoring request includes information on the legacy device and types of data to be collected from the legacy device;

selecting a smart device among a plurality of smart devices to monitor the legacy device, wherein the smart device is a smart home appliance, and wherein the plurality of smart devices communicate with each other and at least one of the plurality of the smart device performs the monitoring request by a user, and wherein the legacy device is incapable of communicating with other devices located in the service area of the smart home automation system;

transmitting, by the smart home automation system, a command signal to control the selected smart device to monitor the legacy device by collecting data outputted from the legacy device;

monitoring the legacy device by the selected smart device, wherein the monitoring results include at least one of a sound level measured from the legacy device, a vibration intensity measured from the legacy device, a temperature measured from the legacy device, an image capturing at least one part of the legacy device, a video data capturing at least one part of the legacy device, audio data outputted from the legacy device, and a combination thereof;

receiving, by the smart home automation system, monitoring results from the selected smart device;

determining, by the smart home automation system, an output pattern of the legacy device based on the received monitoring results, detecting an operation status of the legacy device by comparing the determined output pattern with at least one output pattern included in a status table of the legacy device, wherein the status table includes information on an output pattern of the legacy device and an operation status mapped to each output pattern of the legacy device, and providing information on the operation status of the legacy device to the user through the user equipment using at least one of the smart devices.

16. The method of claim 15, wherein the selecting the smart device includes:

a smart device located within a predetermined distance from the legacy device;

a smart device capable of collecting data output from the legacy device; and a smart device capable of communicating to other entities in the smart home automation system.

17. The method of claim 15, comprising:

obtaining user location information of the user;

selecting at least one of the smart devices as the outputting smart device, based on the obtained user location information, wherein the selected at least one of the outputting smart devices includes:

a smart device located within a predetermined distance from an associated user;

a smart device capable of outputting data output from the legacy device; and a smart device capable of communicating to other entities in the smart home automation system.

* * * * *